US011687985B2

(12) United States Patent
Wish

(10) Patent No.: US 11,687,985 B2
(45) Date of Patent: *Jun. 27, 2023

(54) MOVIE OR TELEVISION TITLE RATING SYSTEM

(71) Applicant: Rate and See LLC, Los Angeles, CA (US)

(72) Inventor: Jeffrey Wish, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,148

(22) Filed: Apr. 4, 2022

(65) Prior Publication Data

US 2022/0230210 A1 Jul. 21, 2022

Related U.S. Application Data

(63) Continuation of application No. 17/017,851, filed on Sep. 11, 2020, now Pat. No. 11,295,354.

(60) Provisional application No. 62/899,029, filed on Sep. 11, 2019.

(51) Int. Cl.
| | |
|---|---|
| *G06Q 30/0282* | (2023.01) |
| *G06T 11/00* | (2006.01) |
| *G06T 5/20* | (2006.01) |
| *G06F 16/58* | (2019.01) |
| *G06F 3/0484* | (2022.01) |
| *G06T 5/00* | (2006.01) |
| *H04L 67/01* | (2022.01) |
| *G06T 11/60* | (2006.01) |
| *G06F 17/00* | (2019.01) |

(52) U.S. Cl.
CPC ....... *G06Q 30/0282* (2013.01); *G06F 3/0484* (2013.01); *G06F 16/5866* (2019.01); *G06T 5/002* (2013.01); *G06T 5/20* (2013.01); *G06T 11/001* (2013.01); *H04L 67/01* (2022.05); *G06T 11/60* (2013.01)

(58) Field of Classification Search
CPC .............. G06Q 30/0282; G06F 3/0484; G06F 16/5866; G06T 5/002; G06T 5/20; G06T 11/001; G06T 11/60; H04L 67/01
See application file for complete search history.

(56) References Cited

U.S. PATENT DOCUMENTS

| | | | |
|---|---|---|---|
| 2010/0235407 A1* | 9/2010 | Nichols | G06F 16/48 707/805 |
| 2018/0316976 A1* | 11/2018 | Stein | H04N 21/4828 |
| 2018/0367483 A1* | 12/2018 | Rodriguez | H04L 51/046 |
| 2019/0320234 A1* | 10/2019 | Chong | G06Q 10/025 |
| 2020/0356227 A1* | 11/2020 | Circlaeys | G06F 3/0484 |

* cited by examiner

*Primary Examiner* — Quoc A Tran

(57) ABSTRACT

A computer-implemented method includes communicating a ratings user interface to allow a user to provide a movie title rating value, wherein a movie title rating value is based upon a user's unique appreciation and/or enjoyment of the movie title. The method further includes receiving one or more movie title rating values, the one or more movie title rating value input by the user into the ratings user interface. In addition, the method includes generating one or more movie card images, by the server computing device, for the one or more movie titles based at least in part on the received one or more movie title rating values, the one or more movie card images varying in border design, color, filtering techniques, or opacity based at least in part on the received movie title rating values; and communicating the one or more generated movie card images.

18 Claims, 11 Drawing Sheets

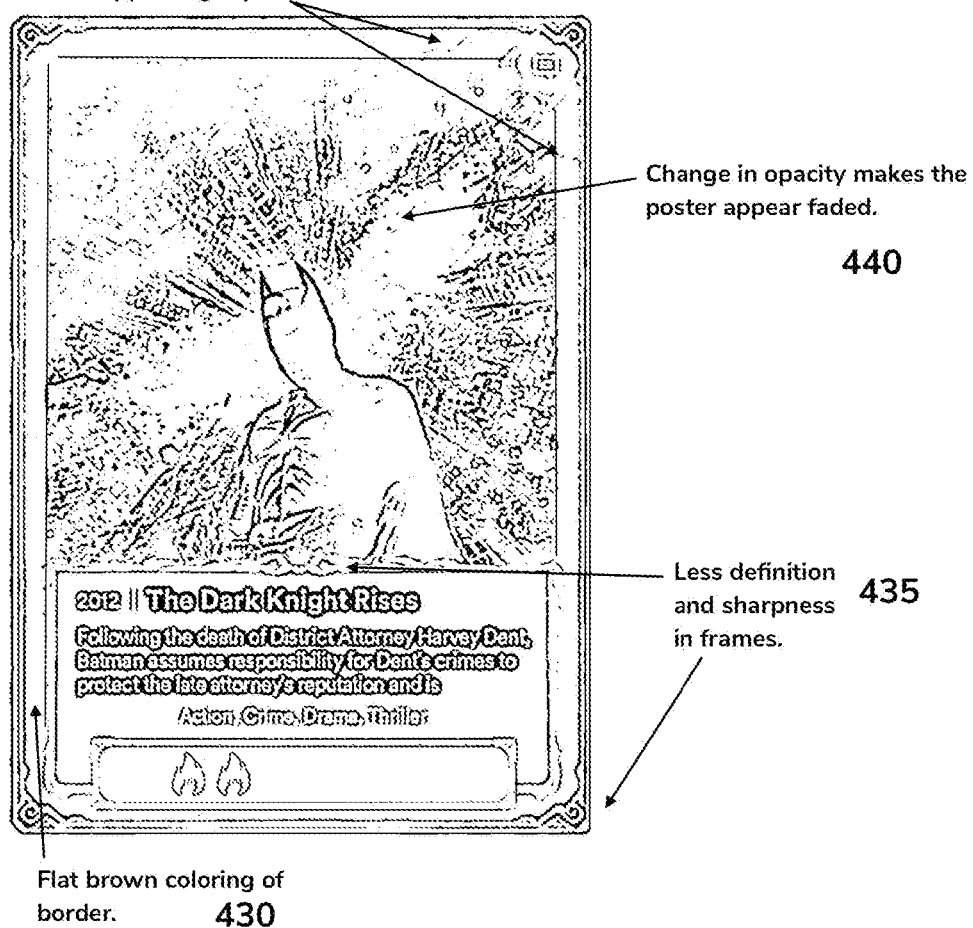

Shining silver coloring of border. 455

Shining gold coloring of border. 460

MOVIE OR TELEVISION TITLE RATING SYSTEM

RELATED APPLICATIONS

This application is a continuation of U.S. non-provisional patent application Ser. No. 17/017,851, filed Sep. 11, 2020, which claims priority to U.S. provisional patent application Ser. No. 62/899,029, filed Sep. 11, 2019, entitled Rate and See Movie Title Rating System, the disclosures of which are both hereby incorporated by reference

BACKGROUND

Currently, there are no online movie rating systems that manipulate images related to movie titles in order to visually illustrate a rating that a user or user(s) have associated with the movie title. The subject matter provided below describes such a new and novel system.

SUMMARY

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 4B illustrates an initial or updated Movie Card image associated with a movie title that has a rating of 2 according to some embodiments;

DETAILED DESCRIPTION

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Figure 1:
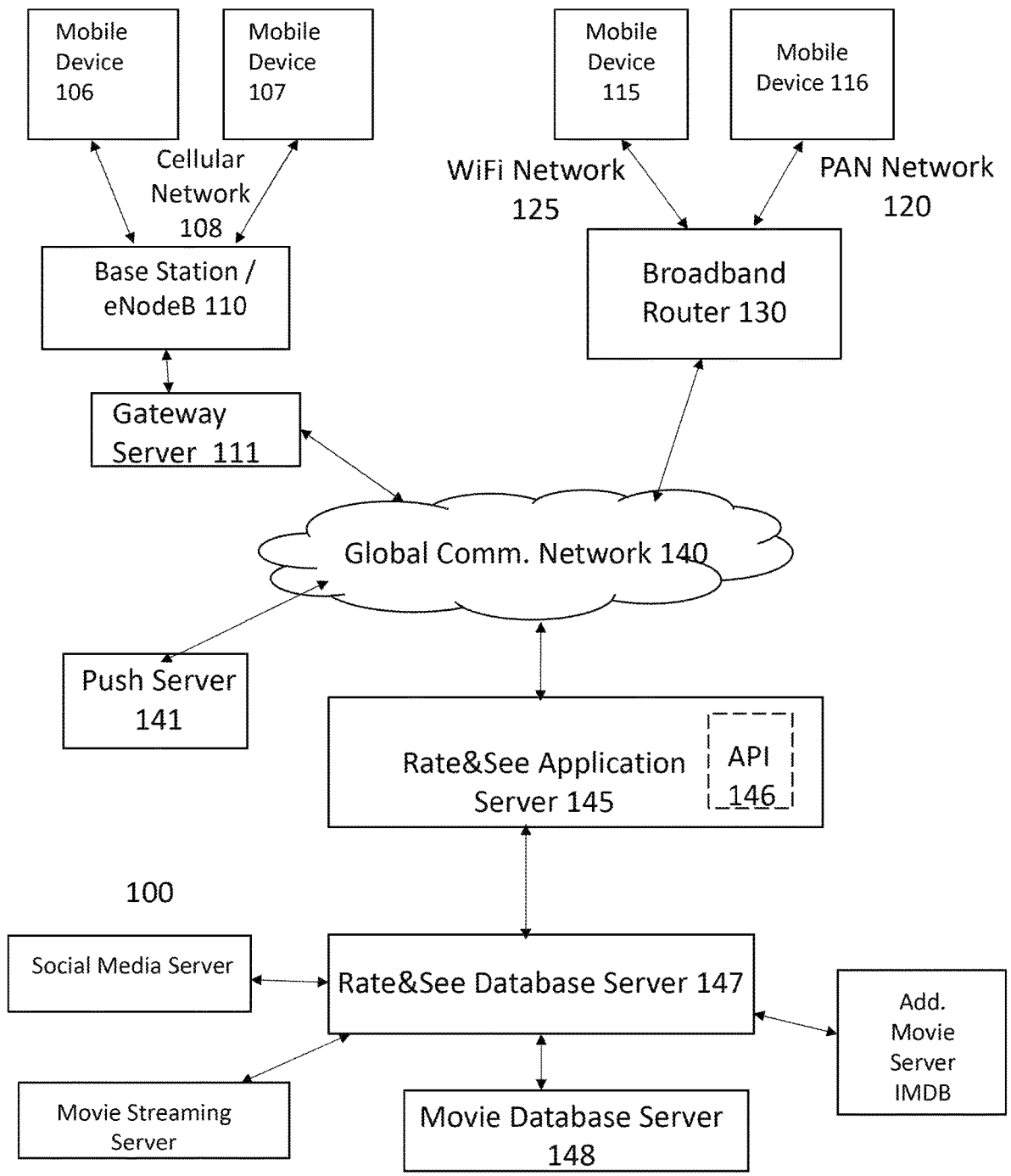
FIG. 1 illustrates a communication and computer network system 100 that implements one or more embodiments of the movie title rating system, in accordance with some embodiments.

Embodiments are directed to a movie title rating system that allows users to rate movie titles according to embodiments. FIG. 1 illustrates a communication and computer network system 100 that implements one or more embodiments of the movie title rating system. In some embodiments, movie title rating system 100 includes a plurality of mobile communication devices 106, 107, 115, and 116 that may be coupled to a global communication network 140, such as the Internet. In some embodiments, the mobile communication devices (or "mobile devices") are each carried and operated by a user. In some embodiments, the mobile communication devices may be smartphones, cellular phones, wearable computing devices, laptop computing devices and/or tablet computing devices. In some embodiments, the mobile communications devices 106, 107, 115 and/or 116 may be able to communicate with one another using known communication methods such as wireless telephony, radio, satellite, cellular systems (e.g., GSM, CDMA, 3G, 4G, 5G and so on), or other similar systems, although not all of the mobile communication devices 106, 107, 115 and/or 116 may have these features In some embodiments, a server computer may be a Rate & See application server 145, which executes computer-readable instructions and runs a Rate & See system process or software. In some embodiments, there may be a push server 141 in between the global communications network 140 and the Rate & See application server 145. In some embodiments, the push server 141 may be in a different location. In some embodiments, the computer-readable instructions may be executable by one or more processors on the Rate & See application server 145. In some embodiments, the Rate & See system process executing on a Rate & See application server 145 may control various data objects relating to one or more movie rating parameters, characteristics and/or information relating to the users of the mobile communication devices. In some embodiments, parameters, characteristics and/or information of the Rate & See (e.g., movie title rating) system users may be stored in a database server 147 (e.g., a Rate & See database server).

In some embodiments, as is discussed below, users of the mobile communication devices may desire or wish to rate movie titles of presently playing and/or historical movies. Because users of the mobile communication devices 106, 107, 115 and/or 116 are inherently transitory and are always on the go or engaging in some other physical or online activity, there needs to be an online system for which these users are easily able to rate movie titles. In some embodiments, parameters and/or characteristics of users may include a profile of each user, and the preferences of each user with respect to movie title genre, actors liked, producers liked, and so on.

In some embodiments, each user who desires to participate in the online movie title rating system may utilize the movie title Rate & See process. In some embodiments, one or more users may, through a subscription, or similar membership-type (free or fee-based) participation models, may register with the movie title Rate & See process by interfacing with the movie title Rate & See application server 145 and providing preferences and other relevant information relating to the user. In some embodiments, access may be free. In some embodiments, entered or supplied parameters, characteristics or preferences for each user or member may be stored in one or more database servers 147 (e.g., Rate & See database servers), which are associated with the Rate & See application servers 145. In some embodiments, parameters, characteristics and/or preferences may be stored and/or are organized in the database servers in, for example, user profiles, user provided parameters, characteristics or preferences. In some embodiments, information and characteristics about movie titles may be stored in one or more database servers 147. In some embodiments, this may include an original poster image of a movie title, a movie title description, a movie title genre or genres, top 2 cast members for the movie title, a movie title release year and director of the movie title (all of which could be displayed on the card also). In some embodiments, this may also include a card image that is utilized to present other movie title information as well as other details about the movie (e.g., other actors, other movie professionals (e.g., cinematographer, musical score director, etc.), running length, etc., some of which may be added by users after viewing and/or watching the movie associated with the movie title. In some embodiments, this information would not be displayed on the cards and instead would be stored in the database. In some embodiments, this may be attached to movie titles so that when a user does cast, crew and title searches, this information may be displayed. In some embodiments, certain information and/or characteristics of the movie title may be retrieved either in real-time or by preloading from a movie title database 148, such as TheMovieDB.

In some embodiments, the mobile devices 106, 107, 115 and/or 116 may communicate with the global communications network 140 and the application servers 145 and/or database servers 147 via a number of communications methods. In some embodiments, as is illustrated by mobile communication devices 106 and 107, may communicate through a cellular network 108 to base stations or eNodeBs 110 and/or gateway servers 111 and then to the global communication network 140. In this illustrative embodiment, the mobile communication devices 106 and 107 are utilizing the cellular network to communicate with the movie title application servers 145 and/or movie title database servers 146.

In some embodiments, a mobile communication device (e.g., such as mobile device 115) may communicate with the global communication network 140 utilizing a WiFi (or wireless local area) network 125 and/or a broadband router 130. In embodiments, a mobile communication device (e.g., such as mobile device 116) may communicate with the global communication network 140 via a personal area network (e.g., Bluetooth network) 120 and/or one or more broadband routers 130.

In some embodiments, each of the mobile communication devices 106, 107, 115 and/or 116 may comprise one or more processors and/or one or more memory devices. In some embodiments, computer-readable instructions executable by one or more processors may operate movie title rating (e.g., Rate & See) system application software and may communicate with the movie title rating system application server 145 and/or movie title system database server 147. In some embodiments, the computer-readable instructions executable by one or more processors may facilitate establishment and management of user's account on the movie title system application server 145 by providing a comprehensive interface to the movie title rating system databases 147 and processes provided on the movie title application server 145. In some embodiments, the mobile communications devices 106, 107, 115 and/or 116 may interface with the movie title application servers 145 through a web server. In some embodiments, the web server may be a server or process that stores data in the form of web pages and transmits these pages as Hypertext Markup Language (HTML) files over the global communication 140 to the mobile communications devices 106, 107, 115 and/or 116. In some embodiments, the one or more mobile devices typically run a web browser program to access the web pages served by the web server and any available content provider or supplemental server that may also be coupled to the network.

As shown in FIG. 1, the movie title rating (e.g., Rate & See) application server computers 145 may execute a server-side movie title rating system process. In some embodiments, an application programming interface (API) 146 may allow users with mobile devices 115, 116, 106 and 107 to utilize browsers to communicate and/or login to the movie title rating application server 145. In some embodiments, the application server computing devices may comprise one or more processors and one or more memory devices. In embodiments, computer-readable instructions executable by the one or more processors may execute the movie title rating system process. In some embodiments, the one or more mobile communications devices 106, 107, 115 and/or 116 may run or execute a client-side version of the movie title rating system program, and/or they may access executable program components over the global communications network 140, such as through a web browser. In embodiments, data, preferences, characteristics and/or parameters for any of the users may be stored both locally (e.g., mobile communications devices 106, 107, 115 and/or 116) and/or in remote computing devices (e.g., such as the movie title rating application server 145 and/or the movie title rating database server 147). In some embodiments, the data, preferences, characteristics and/or parameters may be stored on a separate content provider computer of the one or more database servers 147 (e.g., there may be a designated server). In some embodiments, although the one or more database servers 147 may be shown coupled to the one or more application servers 145, it should be noted that content data (e.g., data, preferences, characteristics and/or parameters) may be stored in one or more different physical locations. In some embodiments, a movie title rating system process may also include a database manager program that manages the different databases stored in the one or more movie title rating database servers 147, which may be organized as separate databases, portions of a single database, or any other logical structure appropriate for storing the data, preferences, characteristics and/or parameters).

As illustrated in FIG. 1, the one or more database servers 147 stores user information, data, parameters and preferences as well as movie title information, parameters, images and/or other related information. In embodiments, the information, data, parameters and preferences may relate to each user of mobile communications devices 106, 107, 115 and/or 116, and may include basic information, such as the username for the user, the password for the user and/or an email address. In embodiments, for example, a user, when creating an account on the social meeting system, may provide an invite-code, which may have been communicated to the user through a messaging service, such as email and/or SMS messaging.

In embodiments, the one or more database servers 147 may also store the user's preference information, such as what type of movie titles the user is interested in rating, which movie titles have already been rated, what upcoming movie titles the user may wish to rate, what actors or directors the user is interested in, and so on. In some embodiments, the one or more database servers 147 may also store graphic and/or image information related to each user, such as any other associated images, as well as graphic and/or image information related to the movie title (e.g., an image of the original movie promotional poster, an image of a trading card incorporating the image of the original movie promotional poster and other relevant information, an image of a trading card after filtering operations have been performed). In some embodiments, a user may add an additional movie poster image by obtaining one from a third-party server (e.g., (TheMoviedb.com)) and adhering to their policies. In some embodiments, the one or more database servers may also request a user's full name, age and/or their gender.

In some embodiments, the user provided database may also store other data objects, such as hypertext links, documents, or other data provided by or associated with the user. In some embodiments, the user may provide information and parameters to the database such as changes to the poster, descriptions, genres, rating input, review input, browse scroll interactions and/or list creations.

In some embodiments, the movie title rating system and/or software may collect and/or capture the following parameters, measurements and information and may store this information in one or more database servers 147. In some embodiments, the parameters, measurements and/or information may be associated with a user's account. In embodiments, the parameters, measurements, and/or information may include specific information that a user inputs into the movie title rating system application software (e.g., personal identifying information, type of computing device utilized); a user's movie title preferences (which may be determined via invitation activity and/or user selection); how many movie titles the user has rated, and/or basic demographics information retrieved, for example, from a user's social media accounts. In some embodiments, a Rate & See user may be provided a transformation video via text messaging so that the Rate & See user could put it on Instagram or another social media platform including video. In some embodiments, a Rate & See user may also turn the video into a gif link via another web link so that the Rate & See system may prompt for a Facebook (or other social medial) post from the user.

Problem Solved—Current movie rating systems may only provide limited visual feedback as to a user's rating or evaluation of a movie. Other movie rating systems do not allow users to feel as though they are accumulating a collection of customizable digital objects or souvenirs after a moving rating is saved. The Rate & See addresses this problem by augmenting a promotional image for the movie title to identify and/or highlight a user's evaluation of the movie. This is an additional feature that current rating systems do not provide. Thus, a need exists for such a rating system. The Rate & See movie title rating system may offer users a simple, well organized and efficient platform for rating, describing, commenting, organizing and sharing all of the movies they have seen. In some embodiments, the movie title ratings may be designed to be completely subjective in order to allow the movie title ratings to define and/or represent the user's personality and/or movie preferences. In some embodiments, this allows the Rate & See system to compare and reference movie title rating data sets and connect users who may have high commonalities and/or correlation in both movie preferences and/or personality. In addition, the visual cue or feedback is applied directly to the movie title rating's representative Movie Card image. Further, in addition, while movie titles are mentioned here, the system and/or process described here may be expanded to other media types, such as books, television programs, music albums, music songs, and/or video games/video game titles, and/or software applications/software application media titles.

References throughout this specification to one implementation, an implementation, one embodiment, embodiments, an embodiment and/or the like means that a particular feature, structure, and/or characteristic described in connection with a particular implementation and/or embodiment is included in at least one implementation and/or embodiment of described subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope and scope of the described subject matter, for example. In general, of course, these and other issues vary with context. Therefore, particular context of description and/or usage provides helpful guidance regarding inferences to be drawn.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on," "based, at least in part on," and/or similar terms (e.g., based at least in part on) are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and described subject matter is not limited to these one or more illustrative examples; however, again, particular context of description and/or usage provides helpful guidance regarding inferences to be drawn.

Portable computing Device, mobile computing device and/or mobile communications device may be used interchangeably herein to refer to a computing device that is portable that includes processing capability and/or communications capability (e.g., both cellular and data communications). This may include network computing devices, smartphones, cellular phones with data capability, tablets, laptop computing devices and/or wearable computing devices that can be utilized with the page turning software application. In some embodiments, computing devices may refer to other more stationary computing devices such as desktop computing devices, server computing devices, and/or cloud-based computing devices. In some embodiments, microprocessors, controllers, microcontrollers, and/or processors may be utilized interchangeably herein.

Figure 2:
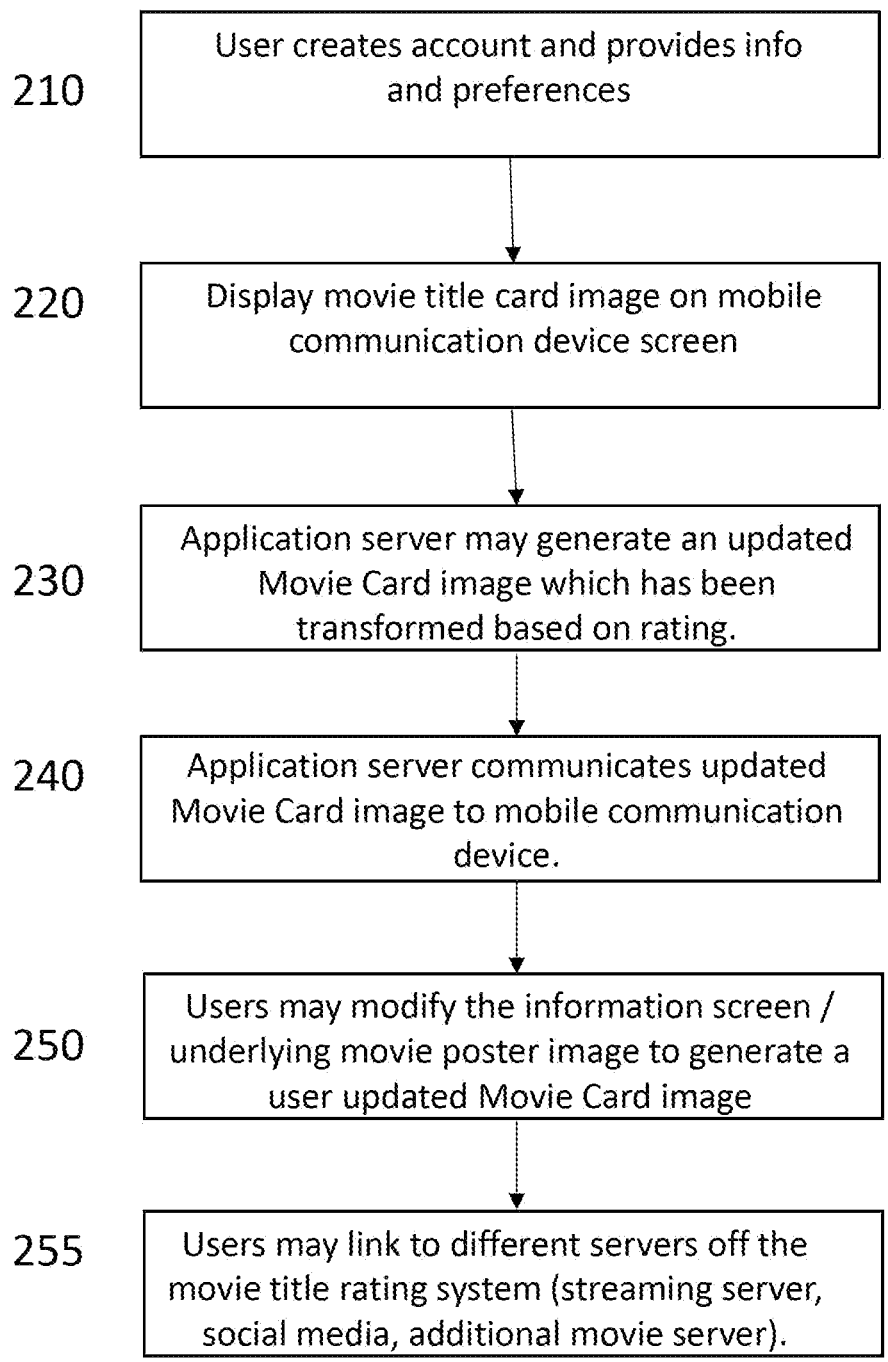
FIG. 2 illustrates a method for rating movie titles according to some embodiments.

FIG. 2 illustrates a method for rating movie titles according to some embodiments. A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

In some embodiments, a visitor or user may initiate a rating software application on a computing device. In some embodiments, a visitor or user may create an account 210 in the movie rating software application. In some embodiments, the visitor or user may enter in an email, a username and/or password. In some embodiments, the visitor may receive a confirmation message (e.g., email) from movie rating server.

In some embodiments, the movie title rating application software may communicate a pop-up screen to the user or visitor to explain and/or provide information regarding the Rate & See's rating system. In some embodiments, the information may detail and/or identify how a rating scale (of the Rate & See rating system) may be intended to be interpreted. In some embodiments, the information on a pop-up screen may also outline additional features and/or functions of the Rate & See software application. To begin rating, visitors may need to create an account by inputting their email, username and password. Once this is received, the user will receive an email to confirm their account from the Rate & See application server. Those without an account, or not currently logged in, may still be able to view any user's "My Collection" page.

In some embodiments, a user or visitor may close a pop-up window. In some embodiments, the Rate & See software application may communicate a Browse Section screen to the mobile communication device for display 220. In some embodiments, a Browse Section screen may comprise and/or be populated by one or more Movie Card (e.g., movie card images). In some embodiments, the Movie Card images may feature information gathered by the API (application programing interface) from the external movie database server 148 (e.g., TheMovieDB.com) and/or from the Rate & See database server 147. In some embodiments, the Movie Card images may include a film's featured poster image (e.g., or promotional poster which), over which users may see an "Info Box" showcasing the title, release year, first portion of it's featured description and genres. In some embodiments, if a user clicks on the movie title, the information screen may cover a greater portion of the promotional poster image and the information screen may reveal the entire movie title description along with the film's director and the top two actors (which may have been provided by the external movie database server 148 and/or the Rate & See database server 147.

In some embodiments, at the bottom of the information box on the Movie card image is a location where users can choose to rate a movie title. In some embodiments, users may enter a movie title rating score or value and the movie title rating score value may be communicated to the movie title rating application server 145 (e.g., the Rate & See server) and may be stored in the movie title rating database server 147 (e.g., the Rate & See database server). In some embodiments, users may pick from 6 possible values (which were discussed and explained on the initial information pop-u screen. In some embodiments, before a rating has been completed, an object representing the six rating possibilities may be displayed on the Movie Card image. In one embodiment, for example, the object may be flames and the six possible movie title rating values may be visible as 6 empty flame silhouettes displayed in a horizontal line on a portion of the movie card image. In some embodiments, a rating of 1 is indicative of a movie being a total bomb, which may mean that at no point did the rating individual think they may like this movie. In some embodiments, a rating of 2 is indicative of a movie rater not being a fan of the movie which may represent that there was a glimmer of hope that the rater would like the movie, but that the hope faded as the movie was viewed. In some embodiments, a rating of 3 is indicative of a movie rater finding the movie enjoyable which means that the rater though it was OK, but this is not a strong recommendation. In some embodiments, a rating of 4 is indicative that the movie rater believes the movie is very good and that this is a strong recommendation. In some embodiments, a rating of a 5 is indicative of a movie rater believing this is his or her kind of flick (e.g., the movie had a bunch of qualities the movie rater personally appreciates). In some embodiments, a rating of 6 is indicative that the movie is the best of the best and it may have had everything the rater looked for in a movie.

In some embodiments, once a movie title rating value is selected by the user, if no ratings have been processed before, the Rate & See application server 147 may create a Movie Card image that reflects the rating of the user. In some embodiments, if the movie title has been rated before but the user is changing the rating, the Rate & See application server 147 may generate an updated Movie Card image reflecting the changed rating of the user 230. In other words, the Rate & See application server, may generate an initial or updated Movie Card image which has been transformed from an original movie promotional image by utilizing techniques to edit and/or adjust the original movie title promotion image and is based on the user's rating. In some embodiments, software on the Rate & See application server 147 may transform the original movie promotional image in response to the user's rating, for example, which may include the Rate & See application server software overlaying one or more filters on top of the original promotional poster image and information box display. In some embodiments, this transformation to an initial or updated Movie Card image (from the original poster image and information box display) may change an opacity of the original poster image to a different opacity in the initial or updated Movie Card image. In some embodiments, the transformation to an initial or updated Movie Card image (from the original poster image and information box display) may change a color of the original poster image to a different color in the initial or updated Movie Card image. In some embodiments, the transformation to an initial or updated Movie Card image (from the original poster image and information box display) may add a border to the original poster image and information box display in the initial or updated Movie Card image. This is a unique feature in that there are no other systems and/or software that change features and/or requirements of images in response to the user's ratings. In some embodiments, a system operator may change the transformation applied to the original poster image to create the initial Movie Card image or the updated Movie Card image. This allows flexibility where a system operator can decide to add in different borders, or apply different filters, for example, in case the system operator wants to change the appearance. In addition, in some embodiments, the updated Movie Card image may also have the rating objects (e.g., flame silhouettes) filled in with red flame images to clearly display and/or identify the user's chosen rating value. In some embodiments, the Rate & See application server 147 may communicate the updated Movie Card image 240 to the mobile communication device for display to the user.

In some embodiments, users may also modify the information screen and/or the underlying movie poster image to generate a user updated Movie Card image 250. In some embodiments, the input user changes may be communicated from the user's mobile communication device to the Rate & See application server 145 and/or Rate & See database server 147 for storage. In addition, the mobile communication device may display the user updated Movie Card image 255. In some embodiments, for example, the users may modify the movie title description (e.g., the description provided and/or featured on the front of the card); may modify the movie title genres (under which the title is associated), import a new promotional poster image the (over which the information box may be displayed), utilize a promotional poster image already stored in the Rate & See server, write a review about the movie title or add the movie title to one or more lists created by the user in a My Collection section of their Rate & See account.

In some embodiments, the Rate & See application server may generate a menu or screen where feature buttons are provided under each updated Movie Card image. In some embodiments, Users may link to different servers off the movie title rating system (streaming server, social media, additional movie server). In some embodiments, links to, for example, IMDB and a movie streaming site may be available before and after card is rated by the user.

In some embodiments, pressing or selecting one feature button may open up a web site that features more detailed information about the movie title (e.g., such as web site IMDB.com). In some embodiments, selection of such a button may cause the Rate & See application server and/or Rate & See database server to communicate with the additional movie server 149. In some embodiments, selection of an another button may open up another website (e.g., Netflix) where the movie associated with the movie title may be streamed onto the user's mobile communication device. In some embodiments, selection of another button may cause the Rate & See application server and/or Rate & See database server to communicate with a movie streaming server 150 (which could be a cable streaming server such as justwatch.com).

In some embodiments, selection of an additional button may generate a Facebook post on the user's account or compose a text message on the user's mobile communication device filled with a short video of that movie's transformation from unrated Movie Card image to the resulting rated updated Movie Card image. In some embodiments, the Facebook post and/or the text message may include a direct link to that user's My Collection page and/or a direct link to the review of the movie (if one was made by the user). In some embodiments, a selection of a last button may initiate the ability for a user to edit and/or change movie information changes previously mentioned. In some embodiments, the last button may be a way of creating a brand new Movie Card image to express a new sentiment on a movie which has already been rated.

In the Rate & See software application, there may be a plurality of different screens or menus. In some embodiments, there may be a Browse scroll menu and/or a My Collection menu. In some embodiments, the Browse Section menu may be a long continuous scroll of Movie Card images. In some embodiments, the population of this scroll may be derived from movie groupings found on the external movie database (The MovieDB.com) TMDB or may be based on other movie title characteristics and/or parameters such as movie titles with: the highest ratings, the highest box office numbers, academy award nominees, and/or the most popular movies (based on interaction metrics), etc. In some embodiments, the Browse scroll menu may be populated when a user performs a search. In some embodiments, for example, if a user selects "Superman," then all Movie Cards (e.g., Movie Card images) may be displayed in the Browse scroll menu. In some embodiments, the Movie Cards (e.g., Movie Card images) that have been rated may be displayed with the ratings and the ones that have yet to be rated by the user may be displayed without ratings. In some embodiments, the browse scroll menu may also adjust itself based on what movie titles a user is choosing to rate by incorporating the recommendations tied to those movie titles. In some embodiments, contents of the Browse Section menu may be filtered by movie genre and/or movie release year. In some embodiments, the Browse scroll menu may also include a search input bar so that movie titles may be found by title, cast names, and/or crew member names. In some embodiments, users may also be able to remove movie titles from the Browse list menu without rating them by hitting the "Remove" selection button and/or to completely remove the movie title from appearing anywhere unless the Movie card images appears by way of search in the Browse section. In some embodiments, users may also be able to add movie titles to their "Watchlist Section" by selecting the Watchlist selection button. In some embodiments, when a movie title is rated, the movie title and/or Movie Card image (e.g., updated Movie Card image) may automatically be added to the user's My Collection web page or menu. In addition, the user's My Collection web page or menu may also add further changes that were made while in the Browse Section menu. In some embodiments, once a user leaves a Browse Section menu (and/or refreshes a Browser section menu) a rated Movie Card image may then be removed from the Browse section menu.

Figure 3A:
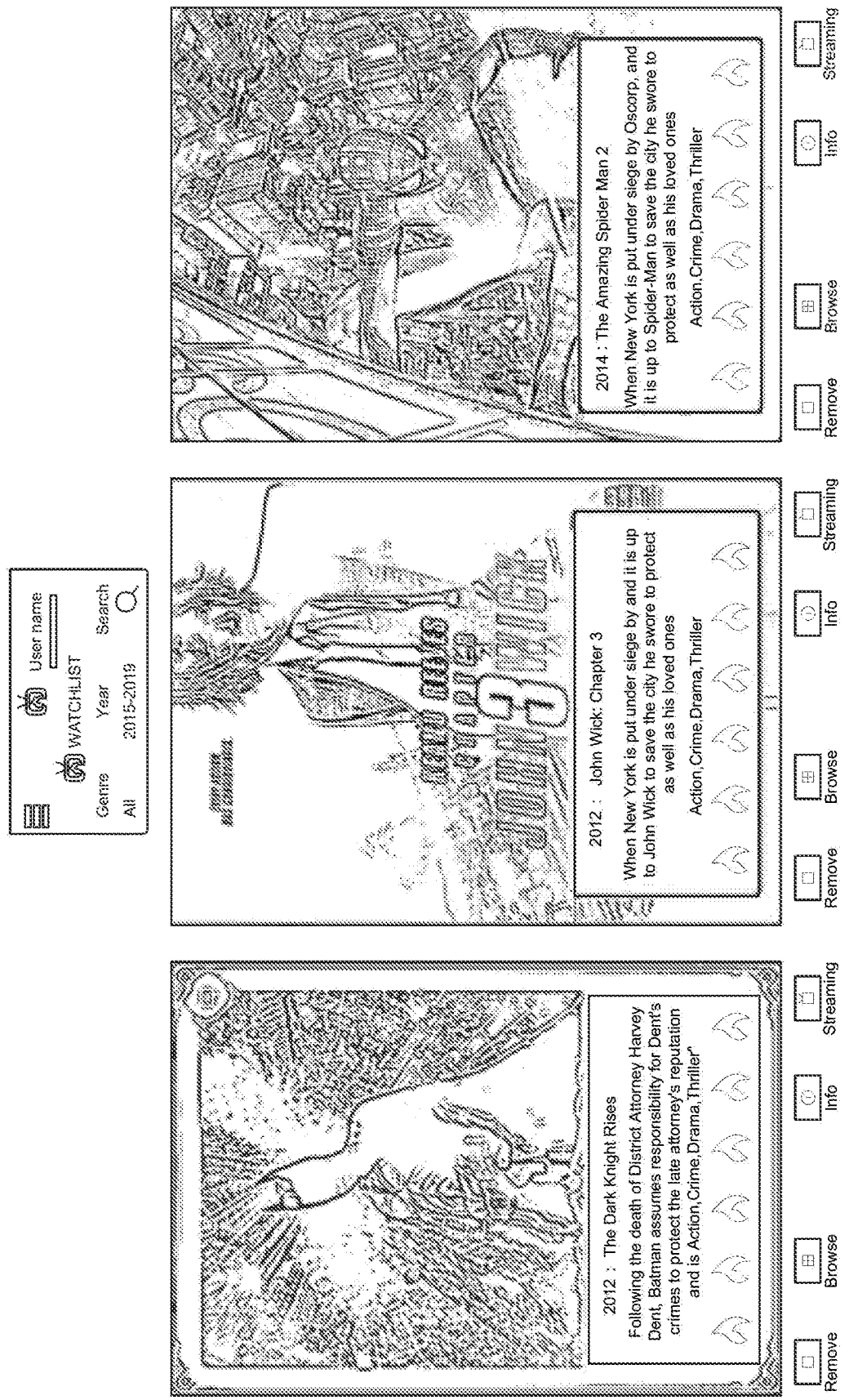
FIG. 3A, three Movie Card images (e.g., Batman, John Wick, and/or Amazing Spiderman) may be displayed in the Watchlist section menu.

In some embodiments, the Watchlist section menu may also function in a similar manner as the Browse section menu described immediately above. In some embodiments, the genre, keyword search and release-year filtering may also be available. In some embodiments, the Watchlist Section menu may also allow a user to move and/or place the movie back in the Browse section menu. FIG. 3A illustrates an example Watchlist section menu according to some embodiments. In some embodiments, for example, three movies may be displayed in the Watchlist Section menu based on the release-year filtering. In some embodiments, for example, as is shown in FIG. 3A, three Movie Card images (e.g., Batman, John Wick, and/or Amazing Spider-man) may be displayed in the Watchlist section menu.

Figure 3B:
FIG. 3B illustrates a My Collection web page or menu according to some embodiments.

In some embodiments, the Rate & See application server (e.g., web site) may also feature a My Collection webpage or menu to house and/or display the rated updated Movie Cards images created by each user. FIG. 3B illustrates a My Collection web page or menu according to some embodiments. In some embodiments, the My Collection webpage or menu may have the same filtering options as the Browse section menu and the Watchlist section menu: e.g., genre, release year and keyword search filtering. In some embodiments, the My Collection webpage or menu may also include other sorting options for displaying and/or arranging the updated Movie Card image. In some embodiments, on the My Collection webpage or menu may arrange the updated Movie Card images by: order of release date, date of rating by the user, and/or alphabetically. In some embodiments, the My Collection webpage or menu may also show or display only movie titles with a specific movie title rating score (e.g., show or display only movies with a rating score of 5 or higher. In some embodiments, on the My Collection webpage, users may also be able to create, name and organize separate lists for their movie titles such as: "Favorite Independent Films" or "Favorite Best Picture Winners", etc. In some embodiments, utilizing the My Collection webpage, users may be able to share an image of these separate lists on their mobile communication device's messaging application or directly to Facebook with the image displaying 9 movie cards arranged in 3 rows by 3 columns.

Creative Applications—In some embodiments, the Rate & See movie title rating system may use its own uniquely designed and/or proprietary rating system. In some embodiments, the movie title rating scale may have 6 different values to select from. In some embodiments, each rating scale value may be based on a movie's ability to hold the user's interest for different quantities of time. In some embodiments, users may be informed that the movie title rating system may be meant to be used with subjective analysis. In some embodiments, in the Rate & See movie title rating system: giving a movie title a rating value of 1 flame may convey that the user became disinterested in the movie very quickly; giving a movie title a rating value of 2 flames may convey that the user became disinterested in the movie towards the middle or end; giving a movie title a rating value of 3 flames may convey that the user was able to watch the entire movie while still being engaged with the movie, however, the movie may not be thought of much after its viewing has ended; Giving a movie title a rating value of 4 flames may convey that the user was engaged throughout the entire movie and retained interest after completion but would most likely not commit to another viewing of the movie; giving a movie title a rating value of 5 flames may convey that the user was engaged throughout the entire movie and could definitely or has already committed to a second viewing of the movie; and giving a movie title a rating value of 6 flames may convey that the user was engaged throughout the entire movie and could definitely or has already committed to multiple or more viewings.

As described above, in response to a movie title being rated, the original promotional movie poster image may be transformed and/or modified into an initial and/or updated Movie Card image. In some embodiments, for example, the initial or updated Movie Card images may be designed to resemble trading cards, e.g., Pokemon, Magic the Gathering, and/or sports player trading cards. In some embodiments, the rating title selected for the movie title may each have unique changes that are made to the initial or updated Movie Card image. In some embodiments, these unique changes may be made by utilizing overlaid filters (such as fading or staining) on the promotional movie poster, changing opacity from the opacity on the original promotional movie poster, adding borders to the original promotional movie poster, and/or changing colors from the color on the original promotional movie poster. In some embodiments, the software on the server computing device and/or the mobile communication device may be executed by one or more processors to create an initial and/or revised Movie Card image by changing the opacity of the original promotional movie poster image to reflect the rating of the movie associated with the Movie Card image. Alternatively, and/or in addition to, the software may change the colors displayed in different areas of the initial and/or updated Movie Card image to reflect the rating of the movie associated with the Movie Card image. Alternatively, and/or in addition to, the software may add borders to the original promotional movie poster image to create the initial and/or updated Movie Card image to reflect the rating of the movie associated with the Movie Card image. Alternatively, and/or addition to, the software may apply filtering techniques (fading, staining, etc.) to the original promotional movie poster image to create the initial and/or updated Movie Card image to reflect the rating of the movie associated with the Movie Card image. In some embodiments, the overlaid filters, the change in opacity, the adding of borders and/or the change in color may be meant to accomplish two things; one is to represent lower movie title rating scores by making the rated or updated Movie Card image look damaged, stained, wrinkled and/or sun-damaged. In contrast, movie titles having higher rating scores may have the updated Movie Card image look more, pristine, prestigious and/or valuable similar in the way that the aforementioned trading card inspirations did. In some embodiments, the overlaid filters, borders, opacity and/or fading technique applications may also provide more overt visual cues of value representation correlating to the selected rating values in a way that no other online rating platform has done to date. In some embodiments, the visual deterioration or enhancement of the updated or rated Movie Card image, based upon the rating value selected, is also intended to make the process of rating a movie more visceral whereby the action can illicit in the user stronger feelings of punishment or reward towards the movie title or film.

Figure 4A:
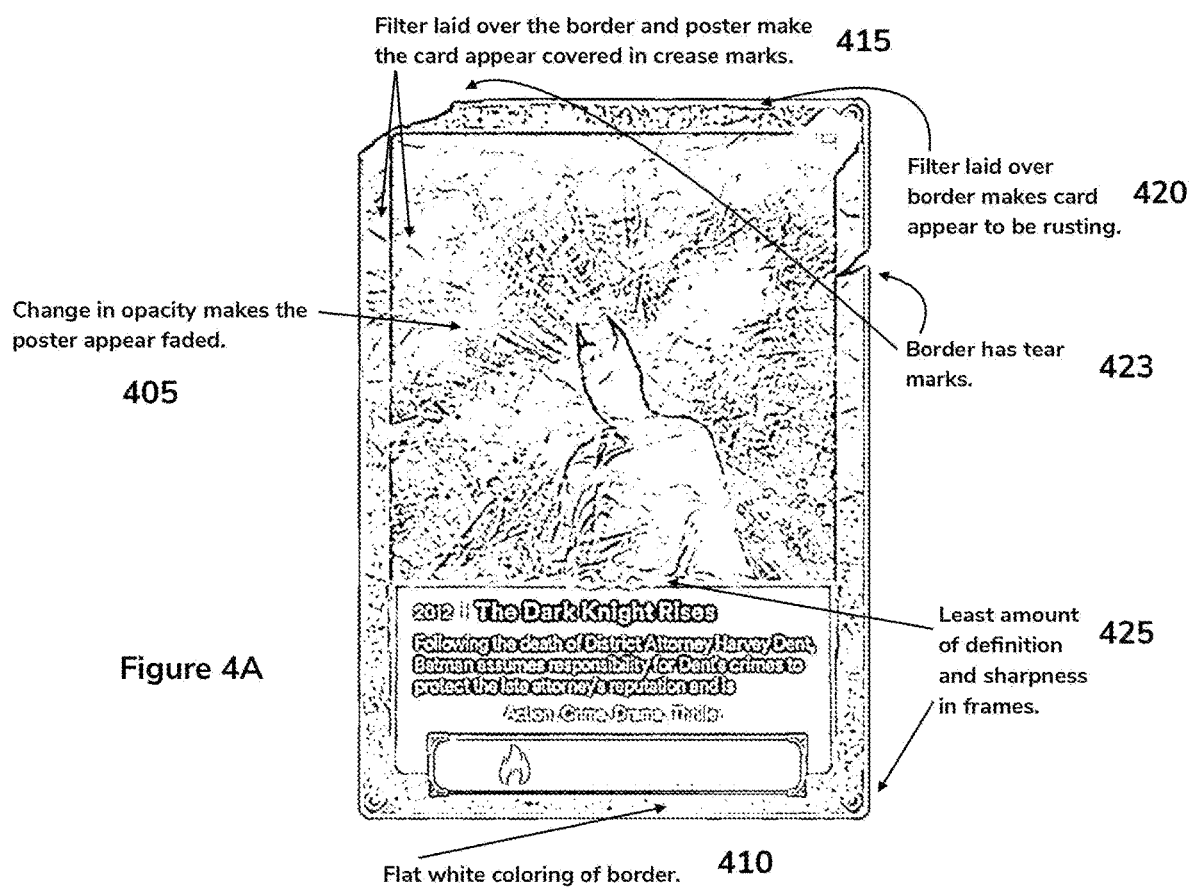
FIG. 4A illustrates an initial or updated Movie Card image associated with a movie title that has a rating of 1 according to some embodiments.
Figure 4C:
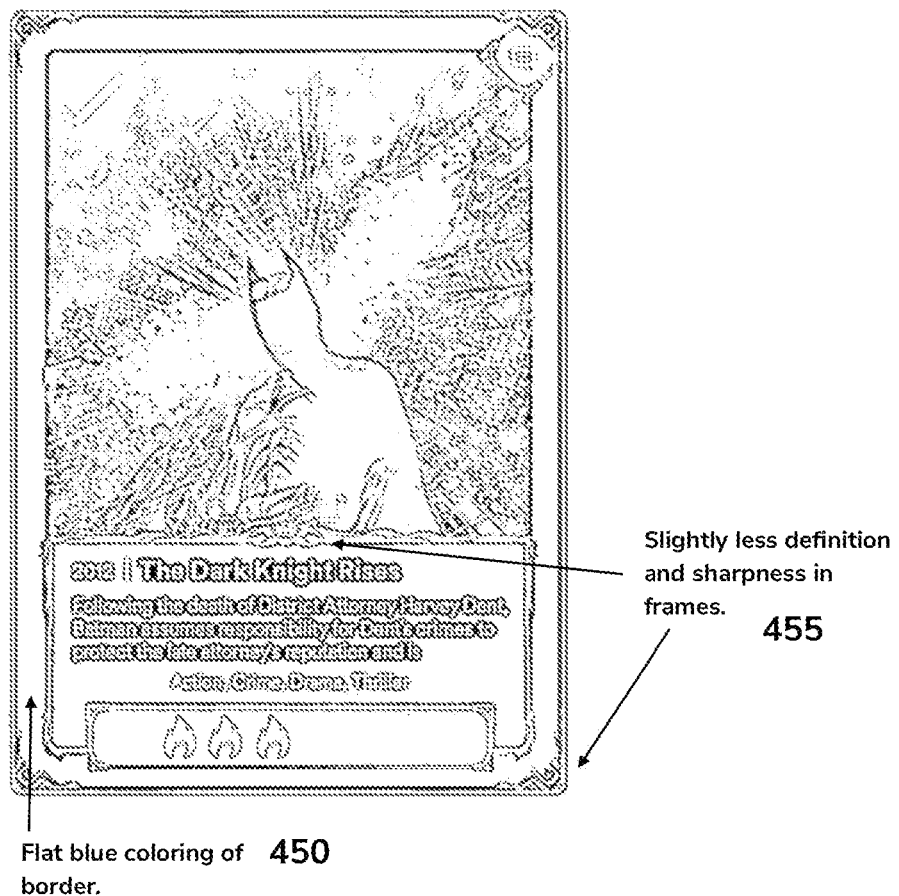
FIG. 4C illustrates an initial or updated Movie Card image associated with a movie title that has a rating of 3 according to some embodiments.
Figure 4D:
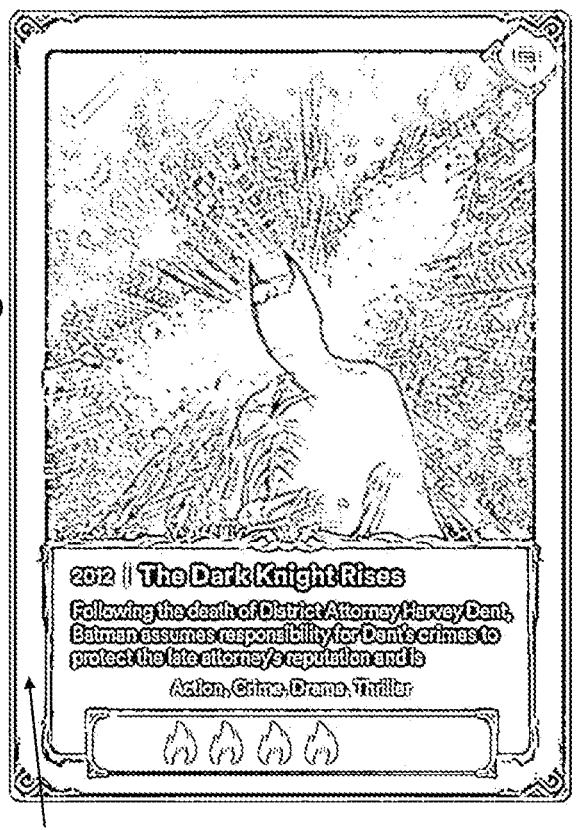
FIG. 4D illustrates an initial or updated Movie Card image associated with a movie title that has a rating of 4 according to some embodiments.
Figure 4E:
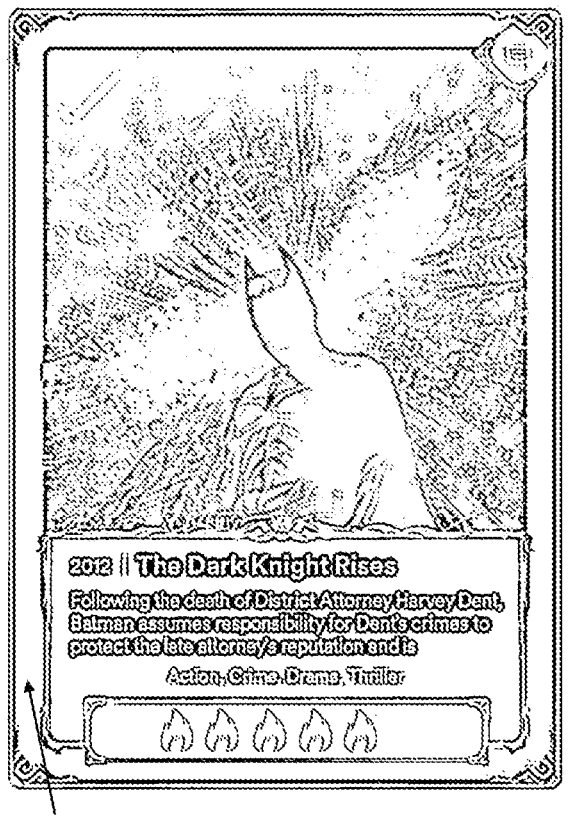
FIG. 4E illustrates an initial or updated Movie Card image associated with a movie title that has a rating of 5 according to some embodiments.
Figure 4F:
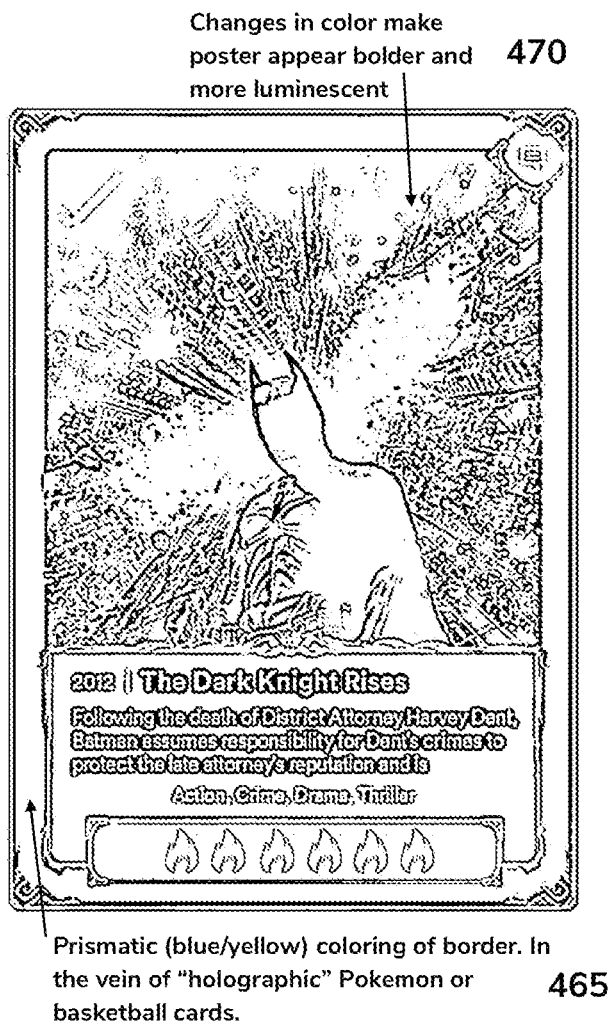
FIG. 4F illustrates an initial or updated Movie Card image associated with a movie title having a rating of 6 according to some embodiments.
Figure 4G:
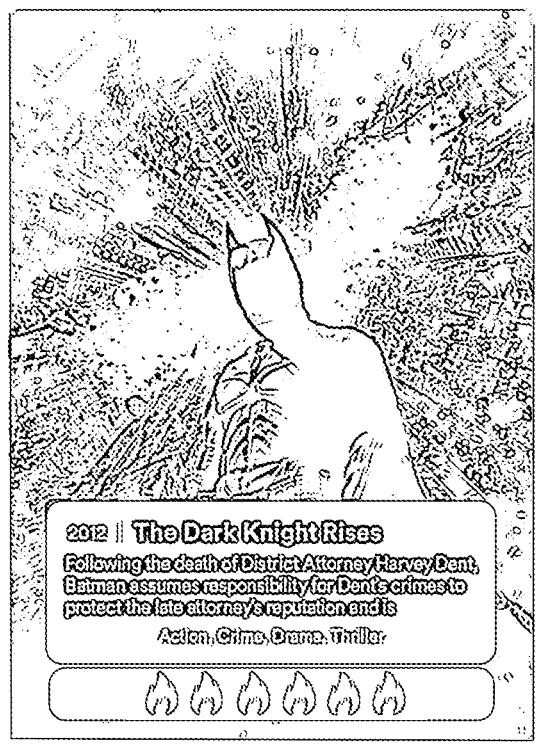
FIG. 4G illustrates a movie promotional poster image with a movie information block as well as an area where ratings may be displayed (e.g., the flames at the bottom of the movie promotional poster image).

FIGS. 4A-4G illustrate Movie Card images that illustrate how filters, change in color, change in opacity and/or adding of borders identify different movie title ratings according to some embodiments. FIG. 4G illustrates a movie promotional poster image with a movie information block as well as an area where ratings may be chosen or selected (e.g., the flames at the bottom of the movie promotional poster image). As discussed previously, a rating of 1 may be the lowest rating. FIG. 4A illustrates an initial or updated Movie Card image associated with a movie title that has a rating of 1 according to some embodiments. In some embodiments, Rate & See software may create an initial Movie Card image or updated Movie Card image with a rating of 1 that includes a change in opacity 405 that makes the Movie Card image appear faded. In some embodiments, for the movie title with a rating of 1, the Rate & See software may add a border with a flat white coloring 410. In some embodiments, the Rate & See software may apply a filter over the border and/or the movie poster image that makes the initial Movie Card image or updated Movie Card image to appear to be covered in crease marks 415. In some embodiments, the Rate & See software may apply a filter over the border that makes the initial or updated Movie Card image to have a border that appears to be rusting 420 and/or a border that has tear marks 423. In some embodiments, the Rate & See software may generate the initial or updated Movie Card image corresponding to a rating of 1 to have the least amount of definition in the frames where the movie information and/or rating is displayed 425.

FIG. 4B illustrates an initial or updated Movie Card image associated with a movie title that has a rating of 2 according to some embodiments. In some embodiments, the Rate & See software may generate an initial or updated Movie Card image by adding a border to the promotional movie poster image and by coloring the border brown 430. In some embodiments, the Rate & See software may generate an initial or updated Movie Card image that has a better definition and sharpness in the frames 435 where the movie information and/or rating is displayed than the Movie Card image associated with the rating of 1. In some embodiments, the Rate & See software may generate the initial or updated Movie Card image by changing the opacity to make the Movie Card image appear to be faded 440. In some embodiments, for an initial or updated Movie Card image with a rating of 2, the Rate & See software may generate an initial or updated Movie Card image by applying a filter over the border and Movie Card image that makes the Movie Card image and border appear to be lightly covered in crease marks 445.

FIG. 4C illustrates an initial or updated Movie Card image associated with a movie title that has a rating of 3 according to some embodiments. In some embodiments, the Rate & See software adds a border and colors the border blue 450 for the initial or updated Movie Card image. In some embodiments, the Rate & See software applies a sharper definition to the movie information and/or the rating flames 455 to the initial or updated Movie Card image. FIG. 4D illustrates an initial or updated Movie Card image associated with a movie title that has a rating of 4 according to some embodiments. In some embodiments, the Rate & See software adds a border and colors the border sterling silver 455 for the initial or updated Movie Card image having a rating of 4. FIG. 4E illustrates an initial or updated Movie Card image associated with a movie title that has a rating of 5 according to some embodiments. In some embodiments, the Rate & See software adds a border and colors the border shining gold 460 for the initial or updated Movie Card image having a rating of 5. FIG. 4F illustrates an initial or updated Movie Card image associated with a movie title having a rating of 5 according to some embodiments. In some embodiments, the Rate & See software adds a border and colors the border a prismatic blue/yellow coloring, which resembles a holographic Pokemon or basketball card 465 for the initial or updated Movie Card image having a rating of 6. In some embodiments, the Rate & See software changes a color of the movie promotional poster to appear bolder and/or more luminescent 470 for the initial or updated Movie Card image having a rating of 6. These are just representative examples of how the Rate & See software may change colors, apply filters, add borders and/or change opacities in order to illustrate ratings for movie titles (or other medias) and should not be limiting.

In some embodiments, the updated Movie Card image design aesthetics are also meant to provoke more feelings of tangibility than what is offered currently by other movie title rating sites. Thus, in the Rate & See software application, the desired effect is that users feel more like they're creating and collecting physical objects through their data input as opposed to simply storing and organizing information.

In some embodiments, the Rate & See software and/or web site may incorporate many of the aspects and/or features used by social media software applications such as Facebook, Twitter and/or Reddit. In some embodiments, users may be able to select an avatar image representing the user, curate and/or create a profile page with a banner image, add a featured quote to associate with the user. In some embodiments, users may be able to message other users through the Rate & See software application, feature specific lists, and/or feature a single or lone Movie Card image. In some embodiments, the Rate & See software application may also include users' profiles that feature a scrolling feed of user generated content and the ability to post content (user-created content or other content) directly to the Rate & See web site such as short messages, reviews the users have created, links to articles, created GIFs, and/or created videos.

In some embodiments, the Rate & See software application and/or web site may allow users to search through posts via hash-tagged keywords. In some embodiments, users may also be able to follow other users in two unique ways: 1) a simple and/or normal follow; and 2) follow while labelling a user as an "Adviser". In some embodiments, the label may be able to distinguish these users as those who offer similar movie evaluations and content helpful towards finding unseen films and/or movie titles more likely to be rated highly by the initial user. In some embodiments, while those simply "Followed" offer more general entertainment or value such as being off-line friends or entertaining content providers.

In some embodiments, the Rate & See software application and/or web site may allow users to up-vote and/or share the content generated by other users. In some embodiments, the Rate & See software application and/or web site may be able to filter what content is presented on the user's feed by seeing postings from every user on the Rate & See web site, what has been posted by users being followed or just users that have been selected as Advisers.

In some embodiments, the Rate & See software application and web site may also host its own messaging functions so that users will be able to communicate privately and directly through the software application and/or website. In some embodiments, the Rate & See software application and/or web site may have a primary function and/or feature to facilitate the connection of its users via a "Similarity Search". In some embodiments, this may be implemented when viewing the user's own My Collection page, where a user may be able to select a button that initiates a site-wide search for similar users. In some embodiments, computer-readable instructions executable by one or more processors may execute or initiate an algorithm to produce the similarity results. In some embodiments, the similarity results may contain and/or include other users whose movie title ratings most closely align with that of the user's on movie titles that have been mutually rated. In some embodiments, the movies analyzed for the search may only include the films or movie titles currently being viewed in the My Collection section at a time when the search was initiated. In some embodiments, for example, if comedies were filtered out upon selection of the Similarity Search button, then any rated film or movie title that has the genre "Comedy" attached to it may not be factored into the similarity search results. In some embodiments, for example, upon seeing the similarity search results, users may also be able to select minimum values for how many movies or movie titles are required to determine these similarity search results. Thus, in a representative example, if the user has selected "100" as the minimum value of "Mutually Rated Titles" as a parameter for the similarity search, the users will not see similarity scores (or movie title rating scores) from any user who has rated 99 or less of the same films. In this embodiment, this parameter prevents the possibility of the similarity search results containing perfect scores from those who have only rated one movie and happened to select the same value as the user who initiated the similarity search. In some embodiments, users may also be able to set and/or select a minimum value for the number of "Total Rated Titles" by the other users who appear in the similarity search results. For example, in a representative example, if the user has selected "100" as the minimum value of "Total Rated Titles" as a parameter for the similarity search, the users will not see similarity scores (or movie title rating scores) from any user who has rated 99 or less total films which could fall into the properties currently set on the initiating user's My Collection page at the time of search implementation. Thus, in this embodiment, users can more easily locate other users with similar movie ratings who can also provide the greatest source of rating data pertaining to movies that haven't yet been rated by the user based on the type of movie desired. Thus, in this embodiment, this feature may allow prospective users of the Rate & See software application and/or web site a better opportunity to locate more unseen films or movie titles carrying a higher potential for prolonged engagement by applying this collaborative filtering feature. In some embodiments, upon viewing the similarity search results, the user may be able to directly visit these other users' profile pages or travel directly to the other users' respective My Collections page. In some embodiments, the other users' respective My Collections page may be filtered in the exact way that the initial user's page was filtered when the similarity search was initiated. In some embodiments, the Similarity Score (e.g., one or the results of the Similarity Search) may be displayed at the top of the other User's My Collection section. In some embodiments, if the initial user chooses to alter the filters on the other user's My Collection section, then the Similarity Score may automatically adjust to incorporate whatever ratings aren't being filtered out.

In some embodiments, the Rate & See software application and/or web site may apply the above-described framework, methods, processes, features and/or functions also intends to the rating of other media products and/or media product titles. In some embodiments, the other media products may be books/book titles, television program/television program titles, video games/video game titles, and/or software applications/software application media titles.

In some embodiments, a computer-implemented method may include (a) accessing computer-readable instructions from one or more memory devices for execution by one or more processors; (b) executing instructions accessed from the one or more physically memory devices by the one or more processors; (c) storing, in the at least one of the physical memory devices, values resulting from having executed the instructions on the one or more processors, wherein the accessed instructions to generate movie ratings for one or more movie titles; and (d) wherein executing the movie title rating instructions further comprising: (e) communicating, by a server computing device, a ratings user interface to allow a user to provide a movie title rating value, the ratings user interface to be displayed by a client computing device, wherein a movie title rating value is based upon a user's unique appreciation and/or enjoyment of the movie title; (f) receiving, by the server computing device, one or more movie title rating values from the client computing device, the one or more movie title rating value input by the user into the ratings user interface, wherein a movie title rating value is based upon a user's unique appreciation and/or enjoyment of the movie title; (g) generating one or more movie card images, by the server computing device, for the one or more movie titles based at least in part on the received one or more movie title rating values, the one or more movie card images varying in border design, color, filtering techniques, or opacity based at least in part on the received movie title rating values; and (h) communicating, by the server computing device, the one or more generated movie card images to the client computing device.

In some embodiments, the displayed movie rating will be showcased or presented as part of the one or more movie card image. In some embodiments, the movie titles are rated with a movie title rating value out of six possible values. In some embodiments, the computer-implemented method may further include storing, by the server computing device, the received ratings for the movie provided by the user; and storing, by the server computing device, the one or more generated movie card images. In some embodiments, a movie card image of the one or more generated movie card images has a modified color as compared to an original movie promotional poster image and wherein the server computing device created the movie card image with the modified color. In some embodiments, the server computing device may add a border to an original movie promotional poster image to generate the movie card image. In some embodiments, the server computing device changes a color of the border of the movie card image to identify the movie title rating value for the movie title.

In some embodiments, the server computing device applies a filter to an original movie promotional poster image to generate a movie card image of the one or more generated movie card images. In some embodiments, the filter application creates a tear mark effect on a portion of the movie card image. In some embodiments, the filter application creates a rusting or deterioration effect on a portion of the movie card image. In some embodiments, the filter application creates a creasing or crease marks effect on a portion of the movie card image. In some embodiments, the filter application creates an effect of a portion of the movie card image where the portion of the movie card image has a less defined sharpness in the image. In some embodiments, the server computing device changes an opacity of an original movie promotional poster image to generate a movie card image of the one or more generated movie card images. In some embodiments, changing the opacity makes the movie card image appear faded as compared to the original movie promotional poster image As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step. In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A computer-implemented method, comprising:
   accessing computer-readable instructions from one or more memory devices for execution by one or more processors;
   executing instructions accessed from the one or more physically memory devices by the one or more processors;
   storing, in the at least one of the physical memory devices, values resulting from having executed the instructions on the one or more processors;
   wherein the accessed instructions to generate movie or television ratings for one or more movie or television titles; and
   wherein executing the movie or television title rating instructions further comprising:
   communicating, by a server computing device, a ratings user interface to allow a user to provide a movie or television title rating value, the ratings user interface to be displayed by a client computing device, wherein a movie or television title rating value is based upon a user's unique appreciation and/or enjoyment of the movie or television title;
   receiving, by the server computing device, one or more movie or television title rating values from the client computing device, the one or more movie or television title rating values input by the user into the ratings user interface, wherein a movie or television title rating value is based upon a user's unique appreciation and/or enjoyment of the movie or television title;
   generating one or more movie or television card images, by the server computing device, for the one or more movie or television titles based at least in part on the received one or more movie or television title rating values, the one or more movie or television card images varying in border design, color, filtering techniques, or opacity based at least in part on the received movie or television title rating values; and
   communicating, by the server computing device, the one or more generated movie or television card images to the client computing device, wherein the server computing device adds a border to one or more images associated with the movie or television title to generate the one or more movie or television card images and the server computing device changes a color of the border of the one or movie or television card images to identify the movie or television title rating value for the movie or television title.

2. The computer-implemented method of claim 1, wherein the server computing device applies a filter to generate the one or more movie or television card images.

3. The computer-implemented method of claim 1, wherein the displayed movie or television title rating will be showcased or presented as part of the one or more movie or television card images.

4. The computer-implemented method of claim 1, wherein the movie or television titles are rated with a movie or television title rating value out of six possible values.

5. The computer-implemented method of claim 1, further comprising storing, by the server computing device, the received ratings for the movie or television program provided by the user; and storing, by the server computing device, the one or more generated movie or television card images.

6. The computer implemented method of claim 1, wherein the one or more generated movie or television card images has a modified color as compared to the one or more original images associated with the movie or television title and wherein the server computing device created the one or more movie or television card images with the modified color.

7. The computer-implemented method of claim 1, wherein the filter application creates an effect of a portion of the one or more movie or television card images where the portion of the one or more movie or television card images has a less defined sharpness in the image.

8. The computer-implemented method of claim 1, wherein the server computing device changes an opacity of the one or more images associated with the with the movie or television title to generate the one or more movie or television card images.

9. The computer-implemented method of claim 8, wherein changing the opacity makes the one or more movie or television card images appear faded as compared to the original one or more images associated with the movie or television title.

10. A computer-implemented method, comprising:
accessing computer-readable instructions from one or more memory devices for execution by one or more processors;
executing instructions accessed from the one or more physically memory devices by the one or more processors;
storing, in the at least one of the physical memory devices, values resulting from having executed the instructions on the one or more processors;
wherein the accessed instructions to generate movie ratings for one or more movie titles; and
wherein executing the movie or television title rating instructions further comprising:
communicating, by a server computing device, a ratings user interface to allow a user to provide a movie or television title rating value, the ratings user interface to be displayed by a client computing device, wherein a movie or television title rating value is based upon a user's unique appreciation and/or enjoyment of the movie or television title;
receiving, by the server computing device, one or more movie or television title rating values from the client computing device, the one or more movie or television title rating value input by the user into the ratings user interface, wherein a movie or television title rating value is based upon a user's unique appreciation and/or enjoyment of the movie or television title;
generating one or more movie or television card images, by the server computing device, for the one or more movie television titles based at least in part on the received one or more movie or television title rating values, the one or more movie or television card images varying in border design, color, filtering techniques, or opacity based at least in part on the received movie or television title rating values; and
communicating, by the server computing device, the one or more generated movie or television card images to the client computing device,
wherein the server computing device applies a filter to one or more images associated with the movie or television title to generate one or more movie or television card images, and wherein the filter application creates a creasing or crease marks effect on a portion of the one or more movie or television card images.

11. The computer-implemented method of 10, wherein the displayed movie or television rating will be showcased or presented as part of the one or more movie or television card images.

12. The computer-implemented method of claim 10, wherein the movie or television titles are rated with a movie or television title rating value out of six possible values.

13. The computer-implemented method of claim 10, further comprising storing, by the server computing device, the received ratings for the movie or television title provided by the user; and storing, by the server computing device, the one or more generated movie or television card images.

14. The computer implemented method of claim 10, wherein the one or more movie or television card images has a modified color as compared to one or more images associated the movie or television title and wherein the server computing device created the one or more movie or television card images with the modified color.

15. The computer-implemented method of claim 10, wherein the filter application creates an effect of a portion of the one or more movie or television card images where the portion of the one or more movie or television card images has a less defined sharpness in the image.

16. The computer-implemented method of claim 10, wherein the server computing device changes an opacity of one or more images associated with the movie or television title to generate one or more movie or television card images.

17. The computer-implemented method of claim 16, wherein changing the opacity makes the one or more movie or television card images appear faded as compared to the original one or more images associated with the movie or television title.

18. A computer-implemented method, comprising:
accessing computer-readable instructions from one or more memory devices for execution by one or more processors;
executing instructions accessed from the one or more physically memory devices by the one or more processors;
storing, in the at least one of the physical memory devices, values resulting from having executed the instructions on the one or more processors;
wherein the accessed instructions to generate movie or television ratings for one or more movie or television titles; and
wherein executing the movie or television title rating instructions further comprising:
communicating, by a server computing device, a ratings user interface to allow a user to provide a movie or television title rating value, the ratings user interface to be displayed by a client computing device, wherein a movie or television title rating value is based upon a user's unique appreciation and/or enjoyment of the movie or television title;

receiving, by the server computing device, one or more movie or television title rating values from the client computing device, the one or more movie or television title rating value input by the user into the ratings user interface, wherein a movie or television title rating value is based upon a user's unique appreciation and/or enjoyment of the movie or television title;

generating one or more movie or television card images, by the server computing device, for the one or more movie or television titles based at least in part on the received one or more movie or television title rating values, the one or more movie or television card images varying in border design, color, filtering techniques, or opacity based at least in part on the received movie or television title rating values; and communicating, by the server computing device, the one or more generated movie or television card images to the client computing device, wherein the server computing device applies a filter to one or more images associated with the movie or television title to generate the one or more movie or television card images, and wherein the filter application creates a tear mark effect on a portion of the one or more movie card images or a rusting or deterioration effect on a portion of the one or more movie card images.

* * * * *